July 1, 1924.
R. C. RUSSELL
1,499,596
FASTENING DEVICE
Filed May 22, 1923
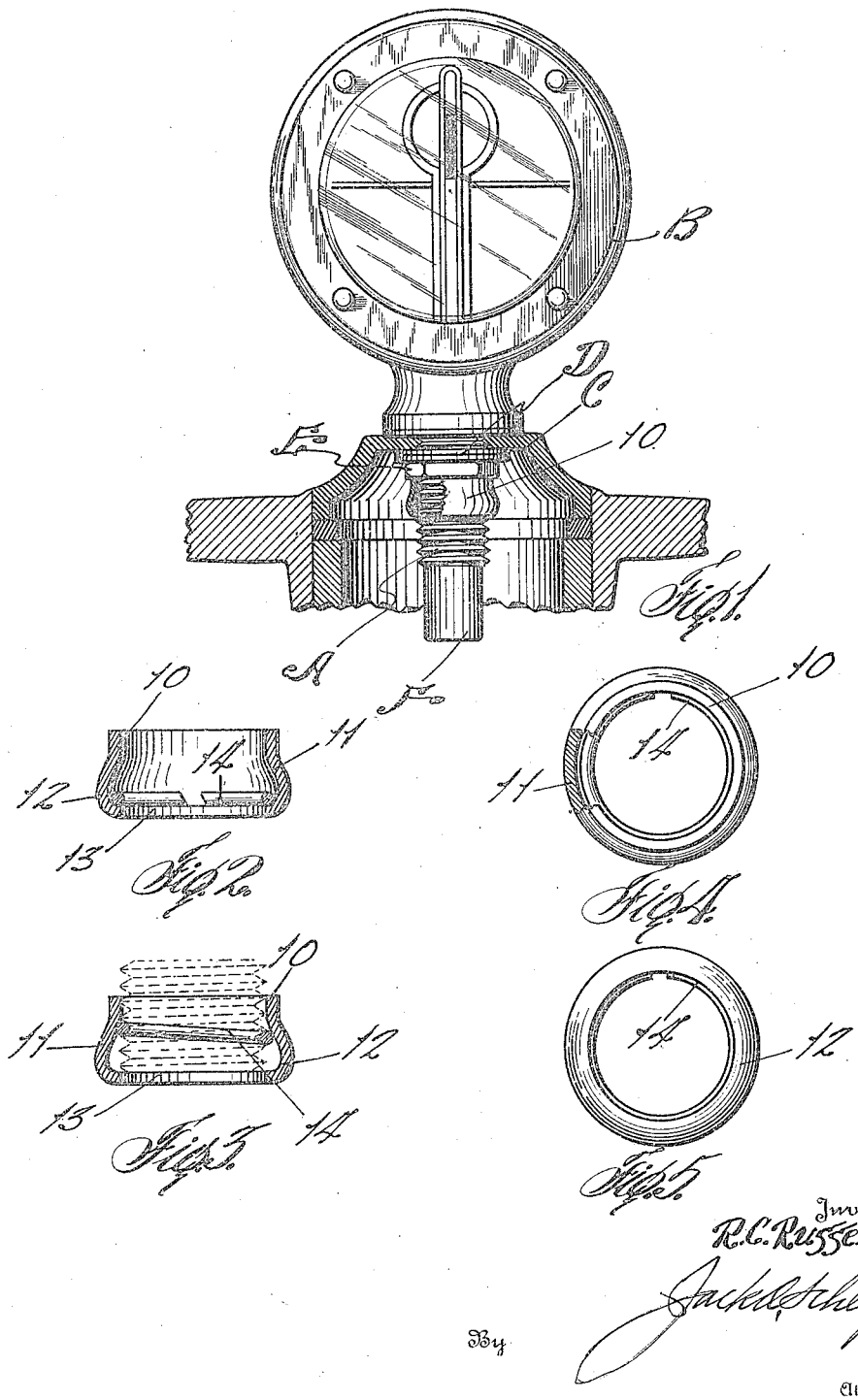
Inventor
R.C. Russell
By Jack L. Ashley
Attorney Patented July 1, 1924.

1,499,596

UNITED STATES PATENT OFFICE.

ROBERT C. RUSSELL, OF DALLAS, TEXAS, ASSIGNOR TO REES-RUSSELL MANUFACTURING COMPANY, OF DALLAS, TEXAS, A COPARTNERSHIP COMPRISED OF WILLIAM REES, ROBERT C. RUSSELL, AND EVAN REES.

FASTENING DEVICE.

Application filed May 22, 1923. Serial No. 640,678.

*To all whom it may concern:*

Be it known that I, ROBERT C. RUSSELL, citizen of the United States of America, residing at Dallas, in the county of Dallas and State of Texas, have invented certain new and useful Improvements in Fastening Devices, of which the following is a specification.

This invention relates to new and useful improvements in fastening devices.

The object of the invention is to provide a fastening device which may be slid along the screw thread of a threaded member and held against retraction by cooperation between a split annular thread engaging member and a wedging collar surrounding the same.

A construction designed to carry out the invention will be hereinafter described, together with other features of the invention.

The invention will be more readily understood from a reading of the following specification and by reference to the accompanying drawings, in which an example of the invention is shown, and wherein:

Fig. 1, is a view of a motor-meter and radiator cap assembly with a fastening device constructed in accordance with my invention and applied to the stem of the motor-meter for fastening the same in the cap.

Fig. 2, is a sectional view of the device, the ring being in its normal or released position.

Fig. 3, is a similar view, the ring being in its fastening position.

Fig. 4, is a plan view of the same, and

Fig. 5, is an underside view of the same.

In the drawings, the numeral 10 designates an annular collar which is expanded or flared outwardly at its lower end to form upwardly and inwardly inclined walls 11. This provides an annular pocket 12, at the bottom of the collar. At the bottom of the collar an inwardly directed flange 13, forms the bottom of the pocket.

Within the collar is disposed a split ring 14, which has a diameter greater than the inner diameter of the top of the collar and the flange 13. The ring is thus retained in the collar, but is free to expand into the pocket 12.

In using the device the collar and flange are given an inner diameter of such amplitude as to pass snugly but freely over the screw threads of the member to which it is to be fastened and the ring has a normal diameter slightly less than that of the threaded member so as to be spread by the latter and seat in the threads thereof.

I have shown the device in connection with the stem "A" of a motor-meter "B," but its use is not to be thus limited. The motor-meter is inserted through a cap "C" and is fastened by the usual washer "D" and nut "E." The lower end, "F," of the stem is smooth while the upper portion is screw threaded. The collar is placed on the lower end of the stem and slid upwardly. When the ring 14 engages the threads it will be supported on the flange 13 and expanded or spread into the pocket 12, riding over the successive threads as the upward movement of the collar is continued. The collar is jambed against the nut "E" and the ring 14 becomes stationary in one of the convolutions between the threads.

The collar when released, will fall slightly until the walls 11 wedge on the ring. This movement, however, will be very slight.

Any attempt to pull the collar downward will wedge the same more tightly on the ring and, therefore, it will be impossible to remove the nut "E" or the motor-meter. The collar will rotate freely on the ring, but will not move the latter and, therefore, there is no screwing action. To remove the collar it must be destroyed. The collar may be stamped, spun or cast and spring wire may be employed to form the ring.

Various changes in the shape and size of the parts as well as modifications may be made within the scope of the appended claims.

What I claim, is,

1. A fastening device for engaging screw threads comprising a collar having an annular pocket, and a resilient split ring adapted to expand into said pocket when engaged with screw threads.

2. A fastening device for engaging screw threads comprising a collar having inwardly inclined walls, and a resilient split ring loosely confined in the collar and upon which the collar is adapted to wedge.

3. A fastening device for engaging screw threads comprising a collar having an annular pocket at its bottom and upwardly and inwardly inclined walls extending from the pockets, an annular inwardly directed flange forming the bottom of the pocket, and a resilient split ring normally resting on the flange in the pocket.

4. In a fastening device, the combination with a screw threaded member, of an annular collar having an annular pocket and inwardly inclined walls extending from the pocket, said collar being slid upon the threads of the member, and a resilient split ring normally held in the pocket when the collar is slid to position on the member and upon which the inclined walls wedge when the collar is moved in reverse direction.

5. A fastening device for engaging screw threads comprising a collar having an outward flare, and a resilient split ring embracing the threads and expandible into the flared portion of the collar.

In testimony whereof I affix my signature.

ROBERT C. RUSSELL.